United States Patent

Kim et al.

[11] Patent Number: 5,930,711
[45] Date of Patent: Jul. 27, 1999

[54] HANDOFF TEST METHOD BETWEEN MOBILE COMMUNICATION SWITCHING STATIONS

[75] Inventors: Dae-Sik Kim, Ichon-shi; Kang-Jou Kim, Anyang-shi; Yong-Tae Jeong, Taejon-shi, all of Rep. of Korea

[73] Assignee: Hyundai Electronics Industries Co., Ltd., Kyonggi-do, Rep. of Korea

[21] Appl. No.: 08/880,103

[22] Filed: Jun. 20, 1997

[30] Foreign Application Priority Data

Jun. 24, 1996 [KR] Rep. of Korea .................. 96-23362
Jun. 24, 1996 [KR] Rep. of Korea .................. 96-23363
Jun. 24, 1996 [KR] Rep. of Korea .................. 96-23364
Jun. 24, 1996 [KR] Rep. of Korea .................. 96-23365

[51] Int. Cl.$^6$ ........................................... H04Q 7/20
[52] U.S. Cl. ..................... 455/436; 370/331; 379/60
[58] Field of Search .................... 455/436, 439, 455/438, 442, 524, 525, 560; 370/331, 524, 525; 379/58, 59, 60

[56] References Cited

U.S. PATENT DOCUMENTS

| 5,541,979 | 7/1996 | Leslie et al. ...................... 379/60 |
| 5,550,828 | 8/1996 | Gries et al. . |
| 5,634,192 | 5/1997 | Meche et al. ..................... 455/33.2 |
| 5,682,380 | 10/1997 | Park et al. ........................ 370/331 |
| 5,737,704 | 4/1998 | Jin et al. .......................... 455/450 |
| 5,794,144 | 3/1996 | Comer et al. ..................... 455/426 |

*Primary Examiner*—Wellington Chin
*Assistant Examiner*—Congvan Tran
*Attorney, Agent, or Firm*—McAulay Nissen Goldberg Kiel & Hand, LLP

[57] ABSTRACT

An improved handoff test method for mobile communication stations which is capable of more easily testing a handoff function between switching stations by providing a handoff generation and control apparatus and processing a forward hard handoff and a backward hard handoff using a handoff signal and a control signal outputted from the handoff generation and control apparatus. The method comprises the steps of a first step for judging whether a test hard handoff signal from a handoff generation and control apparatus of the exchange station is a forward hard handoff signal or a backward hard handoff signal, a second step for determining whether a forward hard handoff test is performed in the serving exchange station or a forward hard handoff test in the target exchange station when the test hard handoff signal is not a forward hard handoff signal in the first step, a third step for determining whether a backward hard handoff test is performed in the serving exchange station or a backward hard handoff test is performed in the target exchange station when a test hard handoff signal is a backward hard handoff signal in the first step, and a fourth step for performing a forward hard handoff in the serving exchange station when the forward hard handoff test is performed in the exchange station in the second step.

5 Claims, 6 Drawing Sheets

HANDOFF TEST METHOD BETWEEN MOBILE COMMUNICATION SWITCHING STATIONS

BACKGROUND OF THE INVENTION

1. Field of the Invention

The present invention relates to a handoff test method between mobile communication switching stations using a Code Division Multiple Access (CDMA) method, and in particular, to an improved handoff test method between mobile communication switching stations which is capable of more easily testing a handoff function between switching stations by providing a handoff generation and control apparatus and processing a forward hard handoff and a backward hard handoff using a handoff signal and a control signal outputted from the handoff generation and control apparatus.

2. Description of the Conventional Art

Generally, the conventional CDMA mobile communication system is a communication system implemented between mobile communication users or a mobile communication unit and a fixed communication unit by which it is possible to communicate between remote users by using radio signals. The conventional CDMA mobile communication system includes a mobile station which is movable in a predetermined area, a base station for transmitting/receiving a message to/from the mobile station and managing a wireless resource, a control station for controlling the base station and transmitting/receiving a message, and an exchange station for performing a switching operation between the control station and another remote station, and a predetermined network.

In the above-described mobile communication system, it is very important to secure a desired mobility of a subscriber terminal of the mobile station. In order to obtain such desired mobility of the subscriber, a position registration and a handoff technique are needed.

The position registration is a process for reporting various features such as an operational state of a mobile network or itself network to the base station, and the handoff technique is a process for switching a communication path between the mobile station and the base station so that the mobile station is deviated from the service region of the base station or the sector.

As the above-described handoff methods, there are known a soft handoff method which is a handoff method between neighboring stations using the identical frequency and a hard handoff method which is a handoff method between the base station and the exchange station using the different frequencies. In conventional art, the handoff function is tested in order to obtain a more efficiency processing method rather than the above-described handoff.

In particular, in the operation of testing the hard handoff function between the exchange stations, since the mobile network is remotely positioned from the exchange station, when a user moves from the controlled area of one exchange station to another area of the exchange station by using a vehicle, thus generating a hard handoff, the handoff function is tested by performing the handoff operation between the exchange stations by using the thusly generated hard handoff signal and a control signal outputted from the mobile station.

However, in the conventional hard handoff test method, since a user must generate a hard handoff signal between exchange stations which is needed for testing the hard handoff function by moving his position from a control area of one exchange station to another area of the exchange station using a vehicle. The user have to directly move to the area for the handoff function test. In addition, many instruments and high cost are required for generating a desired hard handoff signal, and the test for the handoff function is inefficiently performed.

SUMMARY OF THE INVENTION

Accordingly, it is an object of the present invention to provide a handoff test method for mobile communication switching stations which overcomes the aforementioned problems encountered in the conventional art.

It is another object of the present invention to provide an improved handoff test method for mobile communication stations which is capable more effectively performing a handoff test by installing a handoff generation and control apparatus in an exchange station without using a handoff signal and a control signal from a mobile station based on a user's direct movement at the time of generating a forward hard handoff or a backward hard handoff between exchange stations and processing a handoff operation and processing a forward hard handoff or a backward hard handoff by using a handoff signal and a control signal from the handoff generation and control apparatus, whereby it is possible to significantly reduce the number of necessary staff, time and cost.

It is another object of the present invention to provide an improved handoff test method for mobile communication stations which is capable of more easily testing a handoff function between switching stations by providing a handoff generation and control apparatus and processing a forward hard handoff and a backward hard handoff using a handoff signal and a control signal outputted from the handoff generation and control apparatus.

To achieve the above objects, there is provided a handoff test method for mobile communication switching stations, wherein the mobile communication system includes a mobile station, a base station, a control station, a control station matching unit, a mobile call control unit, and a handoff controller, comprises the steps of a first step for judging whether a test hard handoff signal from a handoff generation and control apparatus of the exchange station is a forward hard handoff signal or a backward hard handoff signal, a second step for determining whether a forward hard handoff test is performed in the serving exchange station or a forward hard handoff test in the target exchange station when the test hard handoff signal is not a forward hard handoff signal in the first step, a third step for determining whether a backward hard handoff test is performed in the serving exchange station or a backward hard handoff test is performed in the target exchange station when a test hard handoff signal is a backward hard handoff signal in the first step, a fourth step for performing a forward hard handoff in the serving exchange station when the forward hard handoff test is performed in the exchange station in the second step, a fifth step for performing a forward hard handoff in the target exchange station when the forward hard handoff test is performed in the target exchange station in the second step, a sixth step for performing a backward hard handoff in the serving exchange station when the backward hard handoff test is performed in the serving exchange station in the third step, and a seventh step for performing a backward hard handoff in the target exchange station when the backward hard handoff test is performed in the target exchange station in the third step.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The hard handoff test method between mobile communication exchange stations according to the present invention will now be explained with reference to the accompanying drawings.

Figure 1:
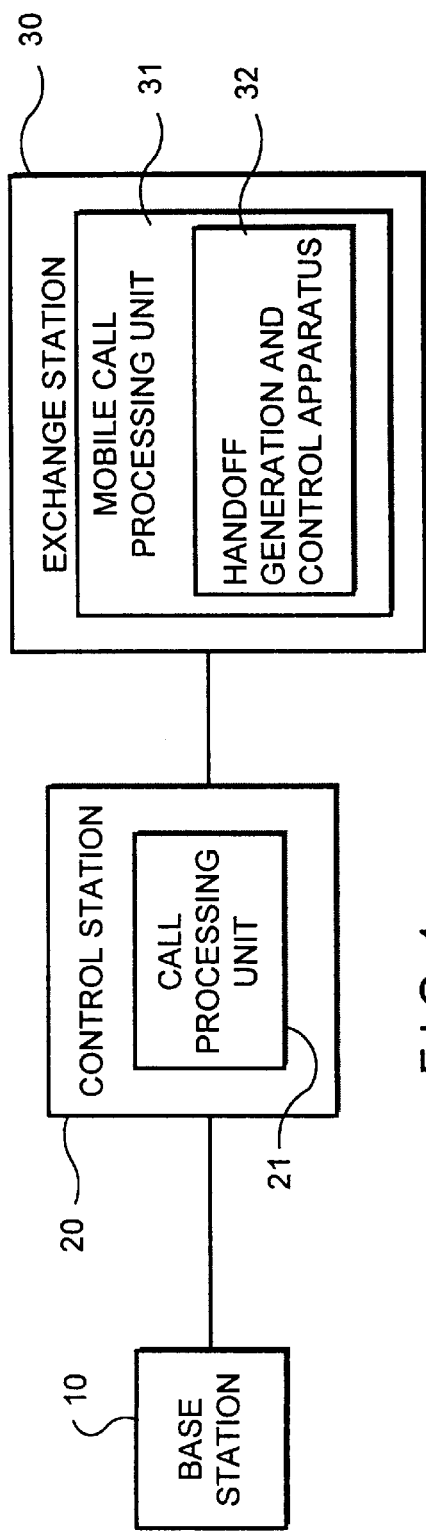
FIG. 1 is a schematic block diagram illustrating the construction of a mobile communication system provided with a handoff generation and control apparatus for a handoff test according to the present invention.

FIG. 1 illustrates the construction of a mobile communication system provided with a handoff generation and control apparatus for a handoff test according to the present invention, wherein a mobile communication system includes a base station 10, a control station 20 having a call processing unit 21, and an exchange station 30. The system includes a handoff generation and control apparatus 32 for generating a hard handoff signal between exchange stations for performing a handoff function test in the mobile call processing unit 31 of the exchange station 30 and controlling the same.

The handoff generation and control apparatus 32 generates a forward hard handoff signal for a serving exchange station based on the movement of a mobile station and transmits the forward hard handoff generation signal to the serving exchange station on behalf of the base station and control station, so that the serving exchange station processes a forward hard handoff.

In addition, a forward hard handoff request signal is generated by the serving exchange station which is generated by the movement of the mobile station and then is transmitted to a target exchange station, so that the target exchange station processes a forward hard handoff operation. A backward hard handoff request signal is generated by the target exchange station by the movement of the mobile station and then is transmitted to the serving exchange station, so that the serving exchange station processes a backward hard handoff operation.

A backward hard handoff signal is generated by the target exchange station by the movement of the mobile station, and the backward hard handoff generation signal is transmitted to the target exchange station on behalf of the base station and the control station, so that the target exchange station processes a backward hard handoff operation.

Figure 2:
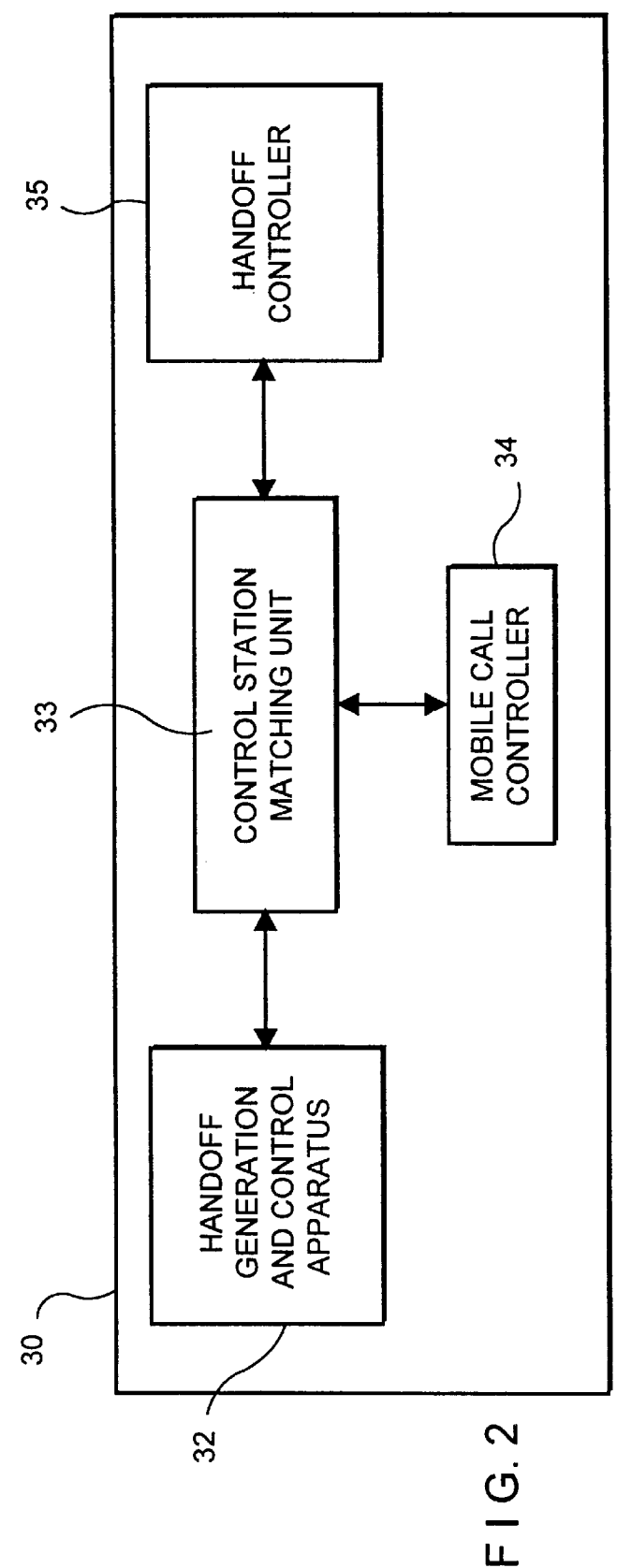
FIG. 2 is a schematic block diagram illustrating the construction of a mobile communication system switching station provided with a handoff generation and control apparatus for a handoff test according to the present invention.

FIG. 2 illustrates the construction of a mobile communication system exchange station 30 provided with a handoff generation and control apparatus 32 for a handoff test operation, which includes a handoff generation and control apparatus 32 for generating a forward hard handoff signal, a forward hard handoff request signal, a backward hard handoff request signal and a backward hard handoff signal, performing a handoff processing function in accordance with the thusly generated hard handoff signals and hard handoff request signals, and controlling a call, a control station matching unit 33 performing a call setting and maintaining function and performing a processing function which is needed for a handoff operation, a mobile controller 34 connected with the control station matching unit 33 for performing an actual call setting and maintaining function, and a handof f controller 35 connected with the control station matching unit 33 for performing an operation needed for the handoff operation and an interacting function with another exchange station.

The handoff generation and control apparatus 32 is loaded to the mobile call controller 34 and is operated as the control station 20, and performs a message transmission and receiving operation together with the control station matching unit 33.

The forward hard handoff and backward hard handoff processing processes performed by the serving exchange station or target exchange station by using a test hard handoff signal and hard handoff request signal outputted from the handoff generation and control apparatus 32 of the mobile communication system exchange station will now be explained with reference to FIGS. 3 through 7.

In the present invention, when a handoff is generated in a state that a mobile station is in use, the exchange station set a first call is called a serving exchange station, and a newly entered exchange station is called a target exchange station.

In addition, the handoff generation and control apparatus 32 generates a forward hard handoff signal, a forward hard handoff request signal, a backward hard handoff request signal, and a backward hard handoff signal. Here, the forward hard handoff signal denotes a hard handoff signal which is generated as a mobile station is first moved from one exchange station service area to another exchange station service area during when a system is in use, and the backward hard handoff signal denotes a hard handoff signal which the mobile station is moved to a previously defined exchange station service area after a forward hard handoff is generated at the time when the mobile station is first moved to another exchange station service area when the system is in use.

Figure 3:
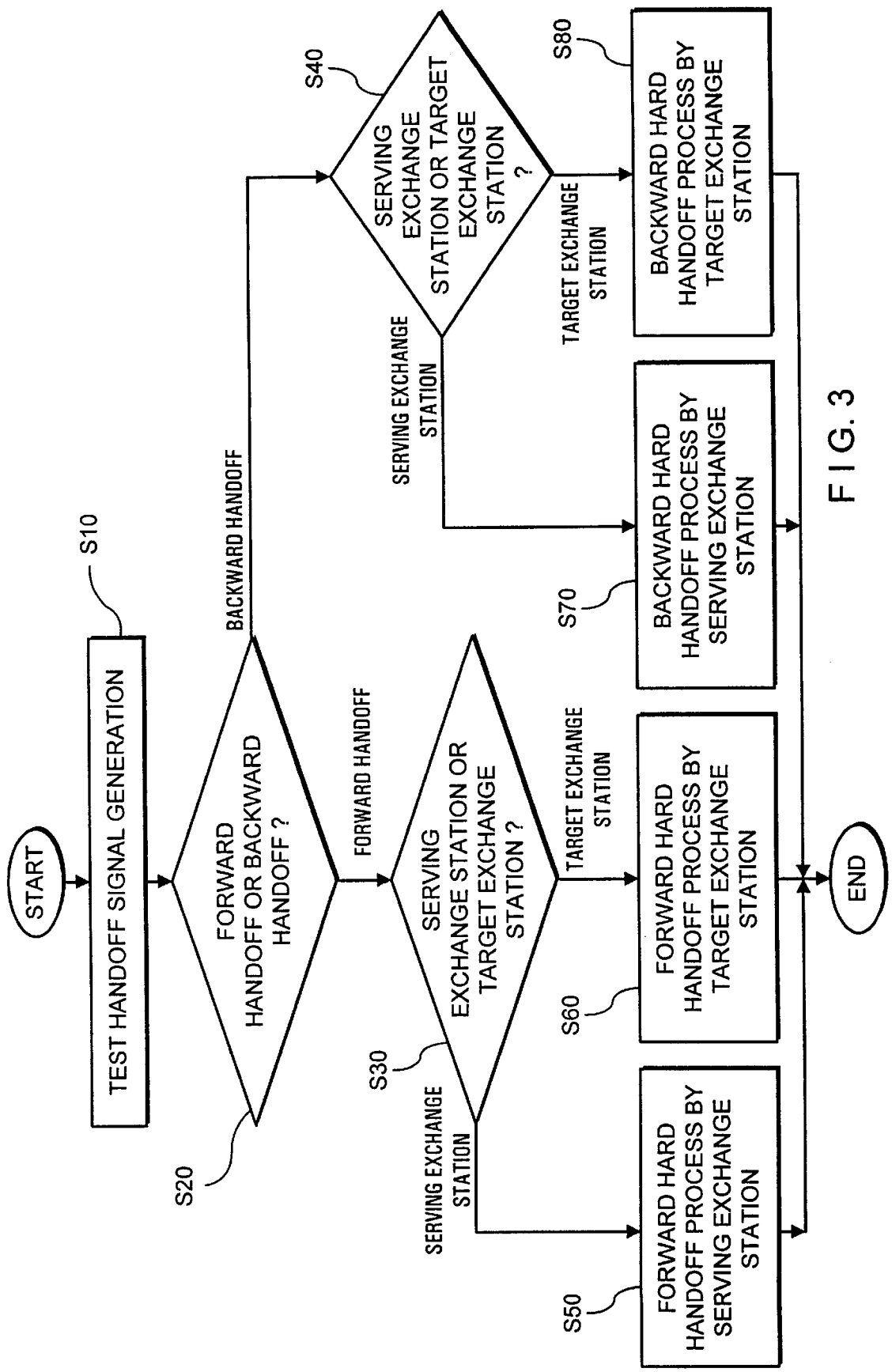
FIG. 3 is a flow chart of a handoff test method between switching stations based on a handoff generation and control apparatus according to the present invention.

FIG. 3 illustrates a flow chart of a hard handoff test method between exchange stations based on the handoff generation and control apparatus 32, in which a handoff function is tested in accordance with the kind of a test handoff signal and a handoff processing step, which signal is outputted from the handoff generation and control apparatus 32 provided in the exchange station 30.

When a test handoff signal is outputted from the handoff generation and control apparatus 32 in Step S10, it is judged whether a test hard handoff signal is a forward hard handoff signal or a backward hard handoff signal in Step S20.

If the test hard handoff signal from the handoff generation and control apparatus 32 in Step S20 is a forward hard handoff signal, it is judged whether a forward hard handoff test is performed by the serving exchange station, or the forward hard handoff test is performed by the target exchange station in Step S30.

In addition, in the case that the test hard handoff signal outputted from the handoff generation and control apparatus 32 in Step S20 is a backward hard handoff signal, it is judged whether the backward hard handoff test is performed by the serving station, or the backward hard handoff test is performed by the target exchange station in Step S40.

In the case that the forward hard handoff test is performed by the serving exchange station in Step S30, the forward hard handoff is performed by the serving exchange station, and in the case that the forward hard handoff test is performed by the target exchange station, the forward hard handoff is performed by the target exchange station in Step S60.

In addition, in the case that the backward hard handoff test is performed by the serving exchange station in Step S40, the backward hard handoff is processed by the serving exchange station in Step S70, and in the case that the backward hard off test is performed by the target exchange station, the backward hard handoff is processed by the target exchange station in Step S80.

Next, the hard handoff processing steps of Steps S50 through S80 will now be explained with reference to FIGS. 4 through 7.

Figure 4:
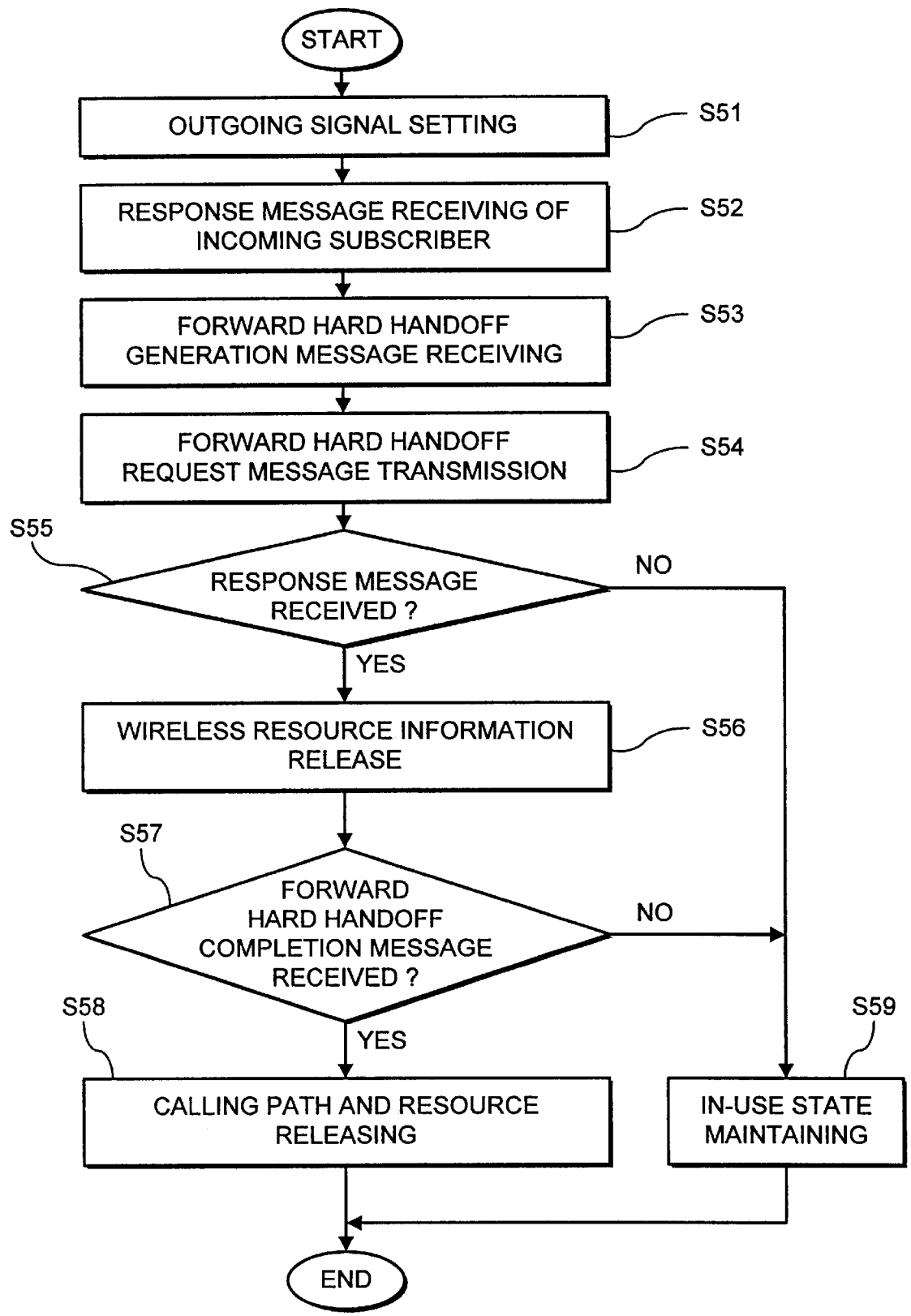
FIG. 4 is a flow chart of a forward hard handoff of a serving switching station based on a handoff generation and control apparatus according to the present invention when a handoff occurs.

FIG. 4 illustrates a forward hard handoff processing flow by the serving exchange station based on the handoff generation and control apparatus 32 when a handoff is generated. The handoff generation and control apparatus 32 of the serving exchange station transmits a transmission subscriber information to the mobile call controller 34 through the control station matching unit 33 and requests an outgoing signal setting operation of a particular subscriber.

The mobile call controller 34 sets an outgoing signal by using the transmission subscriber information transmitted thereto by the handoff generation and control apparatus 32 and reports a state that the outgoing signal setting is completed to the control station matching unit 33, and reports to the handoff generation and control apparatus 32 through the control station matching unit 33 that the outgoing signal is normally set in Step S51.

After the outgoing signal is set, the mobile call controller 34 normally sets an incoming signal by using the receiving subscriber information transmitted thereto from the handoff generation and control apparatus 32 and transmits a response message from the incoming subscriber to the handoff generation and control apparatus 32 through the control station matching unit 33 in Step S52.

Thereafter, the handoff generation and control apparatus 32 receives a response message of the incoming subscriber, recognizes an in-use state of the system based on the thusly received response message, and generates a forward hard handoff generation message which informs that the handoff is generated from a transmission subscriber after about 10 seconds, so that the control station matching unit 33 receives a forward hard handoff generation message in Step S53.

At this time, the handoff generation and control apparatus transmits the information data of the current serving exchange station and the information data of the target exchange area in which the mobile station performs a handoff and is newly positioned to the control station matching unit 33.

When the forward hard handoff message is generated from the handoff generation and control apparatus 32, the control station matching unit 33 informs that then handoff is first generated to the handoff controller 35, and then the handoff controller 35 analyzes the information of the target exchange station of the area in which the mobile station of the handoff generation and control apparatus 32 is newly positioned and prepares a message to be transmitted. After the preparation, the forward hard handoff request message is transmitted to the target exchange station in Step S54.

Meanwhile, the target exchange station which receives the forward hard handoff request message, transmits an information that the mobile station is positioned in the base station area of the current target exchange station to the control station matching unit, and the control station matching unit requests the handoff generation and control apparatus of the target exchange station which operates on behalf of the control station to allocate a new channel based on the information from the mobile station.

The handoff generation and control apparatus which receives a channel allocation request signal processes a handoff operation in which the channel is allocated and transmits a response message with respect to the forward handoff request message to the serving exchange station through the control station matching unit and the handoff controller.

Therefore, the handoff controller 35 of the serving exchange station judges whether a response message corresponding to the forward hard handoff request message is received from the target exchange station which receives the forward hard handoff request message in Step S55.

When the handoff controller 35 receives a response message with respect to the forward hard handoff request message from the target exchange station, the handoff controller 35 transmits a message to release the channel allocation information of the control station matching unit 33, and requests the handoff generation and control apparatus 32 to release the wireless resource information through the control station matching unit 33, so that the handoff generation and control apparatus 32 releases the wireless resource information in Step S56.

Thereafter, when the handoff generation and control apparatus of the target exchange station is connected with a wireless access which is allocated by the same, and then the mobile station reports a state that the forward hard handoff is completed in the current target exchange station to the serving exchange station through the control station matching unit and the handoff controller, the handoff controller 35 of the serving exchange station judges whether the forward handoff completion message of the target exchange station is received in Step S57.

When the handoff controller 35 receives a forward hard handoff completion message in Step S57, the handoff controller 35 requests the control station matching unit 33 to release the handoff, and the control station matching unit 33 requests the handoff generation and control apparatus 32 to release the call control processing step in Step S58.

Meanwhile, in Step S55, when the handoff controller 35 does not receive the response message with respect to the forward hard handoff request message from the target exchange station, or in Step S57, the handoff controller 35 does not receive the forward hard handoff completion message from the target exchange station, the in-use state is maintained in Step S59.

As the handoff generation and control apparatus 32 releases the call control processes, thus completing the forward hard handoff of the outgoing signal, and then the forward hard handoff of the serving exchange station is performed, so that the forward hard handoff function between the serving exchange station and the target exchange station is performed.

Figure 5:
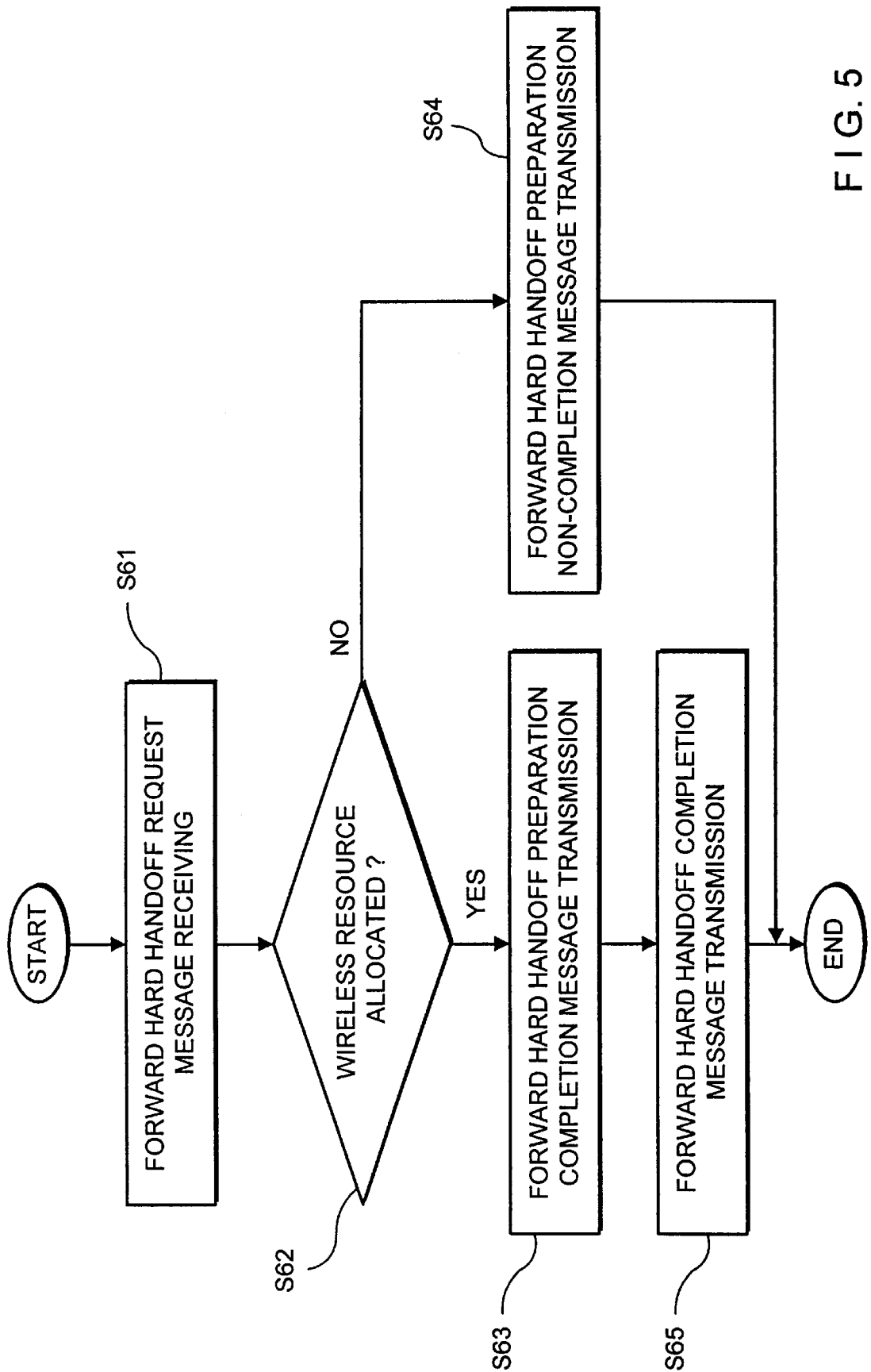
FIG. 5 is a flow chart of a forward hard handoff process of a target switching station based on a handoff generation and control apparatus according to the present invention when a handoff occurs.

FIG. 5 illustrates a forward hard handoff process by the target exchange station based on the handoff generation and control apparatus 32 when the handoff occurs. When a forward hard handoff request message outputted from the serving exchange station, namely, the opposite exchange station, through the handoff generation and control apparatus 32 of the target exchange station is generated like the mobile station is moved from the current serving exchange station to the target exchange station, the handoff controller 35 of the target exchange station receives a forward hard handoff request message in Step S61.

The handoff controller 35 which receives a forward hard handoff request message transmits the hard handoff request message to the control station matching unit 33, and the control station matching unit 33 requests the handoff generation and control apparatus 32, which acts as the control station, to allocates a new wireless resource using the information of the mobile station.

Thereafter, the handoff generation and control apparatus 32 performs some steps which are needed for a handoff such as a wireless resource allocation in accordance with an allocation request of a wireless resource in Step S62, and then transmits a forward hard handoff preparation completion message to the serving exchange station in Step S63.

Namely, the handoff generation and control apparatus 32 transmits the forward hard handoff preparation completion message to the control station matching unit 33, and the control station matching unit 33 reports a state that a preparation is completed for the forward handoff control to the handoff controller 35. Thereafter, the handoff controller 35 transmits the forward hard handoff preparation completion message to the serving exchange station which transmits the forward hard handoff request signal.

In addition, in a case that the handoff generation and control apparatus 32 does not perform some steps for a handoff process, for example, the wireless resource is not allocated, in accordance with the allocation request of the wireless resource in Step S62, the forward hard handoff preparation non-completion message is transmitted to the serving exchange station in Step S64.

As in Step S63, a response massage with respect to the forward hard handoff request which is a forward hard handoff preparation completion message, is transmitted to the serving exchange station which requests the forward hard handoff through the handoff controller 35, and then the handoff generation and control apparatus 32 transmits the forward hard handoff completion message outputted from the target exchange station to the serving exchange station through the control station matching unit 33 and the handoff controller 35 like the forward hard handoff is completed by the target exchange station as the mobile station is moved from a particular base station to the service area of the target exchange station in Step S65.

After the forward hard handoff of the target exchange station is generated, the forward hard handoff function is tested between the serving exchange station and the target exchange station.

Figure 6:
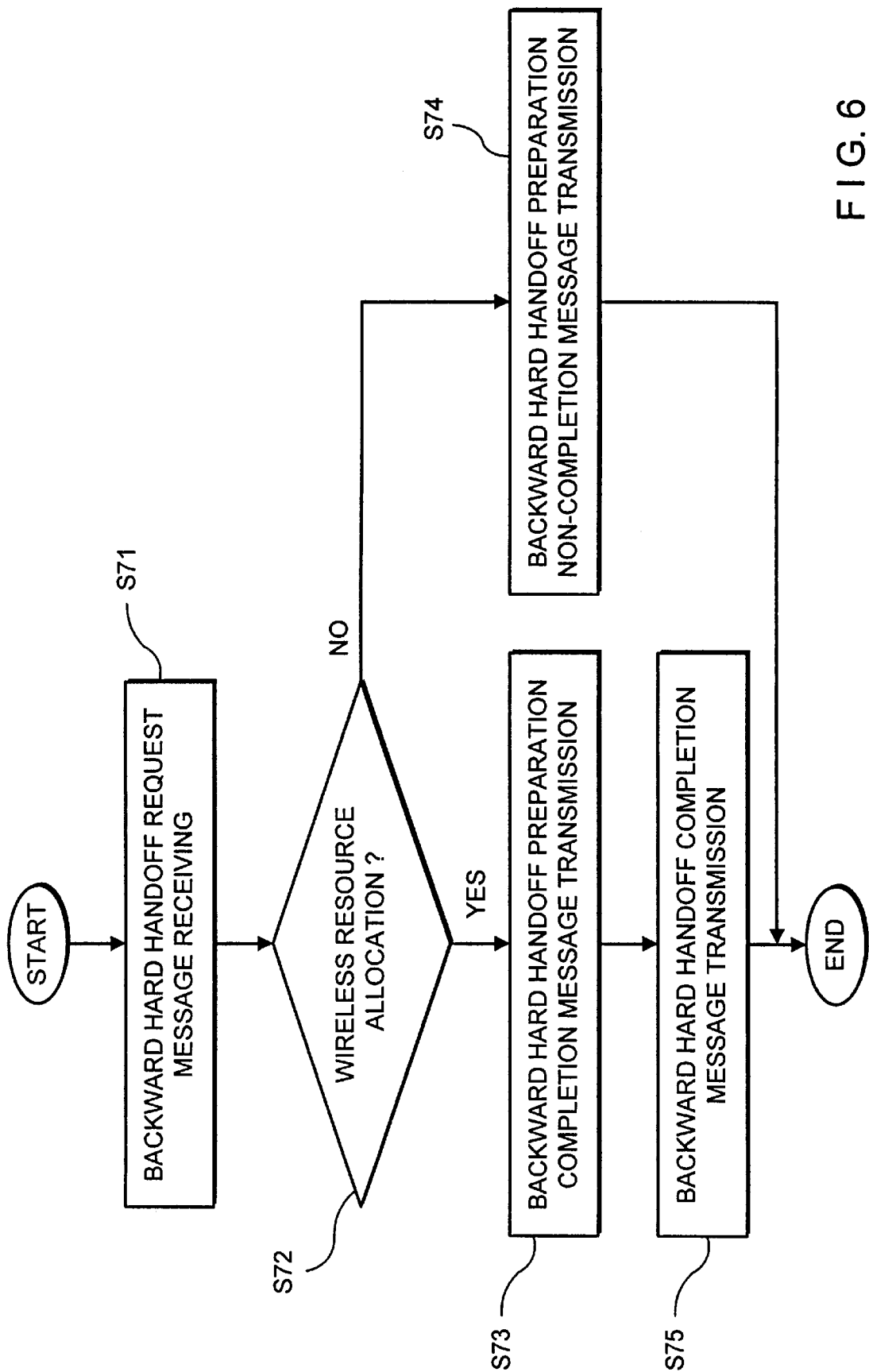
FIG. 6 is a flow chart of a backward hard handoff process of a serving switching station based on a handoff generation and control apparatus according to the present invention when a handoff occurs.

FIG. 6 illustrates a flow chart of a backward hard handoff process by the serving exchange station based on the handoff generation and control apparatus 32 when the handoff is generated. When the backward hard handoff request message is generated from the target exchange station, namely, which is outputted from the opposite exchange station through the handoff generation and control apparatus 32 of the serving exchange station like the mobile station is moved from the serving exchange station to the target exchange station, and then the same is moved from the target exchange station to the serving exchange station, the handoff controller 35 of the serving exchange station receives a backward hard handoff request message in Step S71.

The handoff controller 35 which receives a backward hard handoff request message, transmits then backward handoff request signal to the control station matching unit 33, and the control station matching unit 33 requests the handoff generation and control apparatus 32, which acts as a control station, to allocate a new wireless resource by using an information from the mobile station in Step S72.

Thereafter, the handoff generation and control apparatus 32 performs a preparation operation which is needed for a handoff process such as a wireless resource allocation in accordance with the allocation request of the wireless resource in Step S72 and transmits a backward hard handoff preparation completion message to the target exchange station in Step S73.

Namely, the handoff generation and control apparatus 32 transmits the backward hard handoff preparation completion message to the control station matching unit 33, and the control station matching unit 33 reports a state that the backward hard handoff control preparation is completed to the handoff controller 35. Thereafter, the handoff controller 35 transmits a backward hard handoff preparation completion message to the target exchange station which transmits a backward hard handoff request signal.

Meanwhile, if the handoff generation and control apparatus 32 does not perform a preparation process which is needed for a handoff process, for example, the wireless resource is not allocated in Step S72, the backward hard handoff preparation non-completion message is transmitted to the target exchange station in Step S74.

As in Step S73, the response message with respect to the backward handoff request, which is a backward hard handoff preparation completion message, is transmitted to the target exchange station which requires a backward handoff through the handoff controller 35, and the handoff generation and control apparatus 32 transmits the backward hard handoff completion message outputted from the serving exchange station to the target exchange station through the control station matching unit 33 and the handoff controller 35 like the mobile station is detected to be in the service area of the serving exchange station of a particular base station in Step S75.

The backward hard handoff of the serving exchange station is performed, and then the backward hard handoff function between the serving exchange station and the target exchange station is tested.

Figure 7:
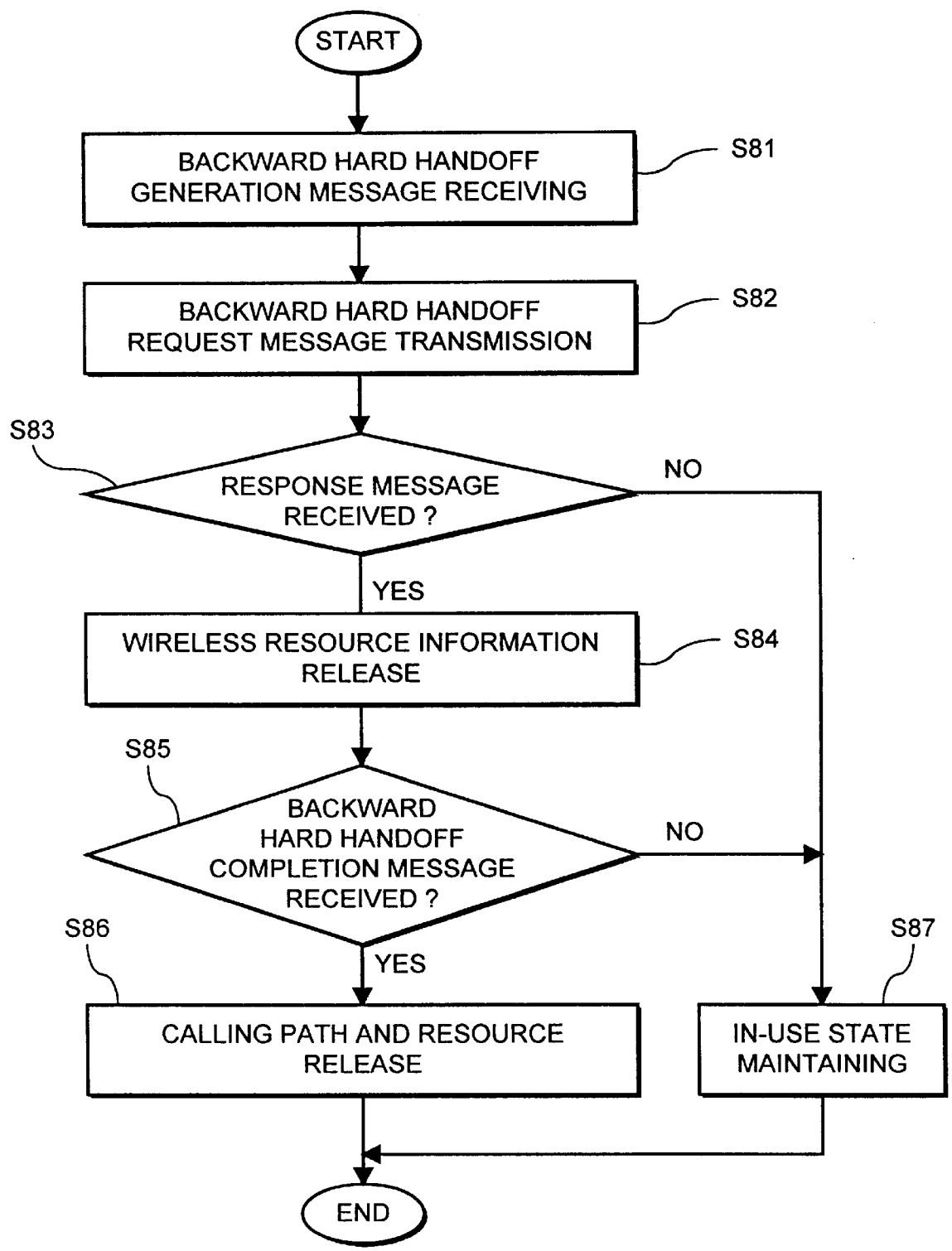
FIG. 7 is a flow chart of a backward hard handoff process of a target switching station based on a handoff generation and control apparatus according to the present invention when a handoff occurs.

FIG. 7 illustrates a backward hard handoff process by the target exchange station based on the handoff generation and control apparatus 32. After the forward handoff is performed toward the target exchange station, when the backward hard handoff message is generated through the handoff generation and control apparatus 32 of the target exchange station like the forward handoff is completed toward the target exchange station, and the mobile station is moved to the serving exchange station in which a previous call is set, the control station matching unit 33 of the target exchange station receives a backward hard handoff generation message in Step S81.

The control station matching unit 33 which receives a backward hard handoff generation message from the handoff generation and control apparatus 32 reports a state that a handoff is repeatedly generated to the handoff controller 35, and then the handoff controller 35 which received a continuous handoff generation message transmits the backward hard handoff request message to the serving exchange station.

Thereafter, the handoff controller 35 judges whether a response message with respect to the backward hard handoff request message from the serving exchange station which receives a backward hard handoff request message is received in Step S83.

In Step S83, when the handoff controller 35 receives a response message with respect to the backward hard handoff request message from the serving exchange station, the handoff controller 35 requests the control station matching unit 33 to release the wireless resource and requests the control station matching unit 33 to release the information of the wireless resource which is allocated to the handoff generation and control apparatus 32, so that the wireless resource information that the handoff generation and control apparatus allocated is released in Step S84.

Thereafter, the handoff controller 35 judges whether a backward hard handoff completion message is received in Step S85, which message means that a backward hard handoff is completed by the serving exchange station. When the backward hard handoff completion message is received, the handoff controller 35 releases a source which is used during the forward hard handoff, and requests the control station matching unit 33 to release the source which is used during the forward hard handoff, and then the control station matching unit 33 requests the handoff generation and control apparatus 32 to release the call process step and releases itself call process step in Step 86.

The handoff generation and control apparatus 32 receives a source release message of the control station matching unit 33, thus clearing all data and releasing the call process step.

In addition, in Step S83, the handoff controller 35 does not receive the response message with respect to the backward hard handoff request message from the serving exchange station, or in Step S84, the handoff controller 35 does not receive a backward hard handoff completion message from the serving exchange station, the in-use state of the system is maintained in Step S87.

The backward hard handoff of the target exchange station is obtained, and it is possible to test the backward hard handoff function between the serving exchange station and the target exchange station.

As described above, in the handoff test method between mobile communication switching stations according to the present invention, since it is possible to test the handoff function between exchange stations by using the test handoff signal from the handoff generation and control apparatus without moving the mobile in order to test the handoff function, it is possible to significantly reduce the number of research members for developing the CDMA mobile communication system and time and cost, thus more effectively testing the handoff.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A handoff test method between mobile communication exchange stations wherein the mobile communication system includes a mobile station, a base station, a control station, a control station matching unit, a mobile call control unit, and a handoff controller, comprising the steps of:

a first step for judging whether a test hard handoff signal from a handoff generation and control apparatus of the exchange station is a forward hard handoff signal or a backward hard handoff signal;

a second step for determining whether a forward hard handoff test is performed in the serving exchange station or a forward hard handoff test in the target exchange station when the test hard handoff signal is not a forward hard handoff signal in the first step;

a third step for determining whether a backward hard handoff test is performed in the serving exchange station or a backward hard handoff test is performed in the target exchange station when a test hard handoff signal is a backward hard handoff signal in the first step;

a fourth step for performing a forward hard handoff in the serving exchange station when the forward hard handoff test is performed in the exchange station in the second step;

a fifth step for performing a forward hard handoff in the target exchange station when the forward hard handoff test is performed in the target exchange station in the second step;

a sixth step for performing a backward hard handoff in the serving exchange station when the backward hard handoff test is performed in the serving exchange station in the third step; and a seventh step for performing a backward hard handoff in the target exchange station when the backward hard handoff test is performed in the target exchange station in the third step.

2. The method of claim 1, wherein said fourth step includes the sub-steps of:

a first sub-step for setting an outgoing signal by a mobile call controller in accordance with an outgoing signal request by the handoff generation and control apparatus of the serving exchange station and receiving a response message of an incoming signal subscriber in accordance with an outgoing signal setting request by the control station;

a second sub-step for receiving a forward hard handoff generation message outputted from the handoff generation and control apparatus when an in-use of the system is recognized based on the response message in the first sub-step and transmitting a forward hard handoff request message to the target exchange station;

a third sub-step for releasing a wireless resource information allocated by the handoff controller, the control station matching unit and the handoff generation and control apparatus when there is a response message with respect to the forward hard handoff request from the target exchange station which receives a forward hard handoff request message in the second sub-step; and a fourth sub-step for performing a forward hard handoff between the serving exchange station and the target exchange station by connecting a newly allocated wireless resource when a forward hard handoff completion message is received from the target exchange station which receives a forward hard handoff request message.

3. The method of claim 1, wherein said fifth step includes the sub-steps of:

a first sub-step for requesting a wireless allocation to the handoff generation and control apparatus through the handoff controller and the control station matching unit when receiving a forward hard handoff request message from the handoff generation and control apparatus of the target exchange station;

a second sub-step in which the handoff generation and control apparatus allocates a wireless resource in accordance with an allocation request of the wireless resource, and a forward hard handoff preparation completion message which denotes that the preparation for the handoff is completed is transmitted to the serving exchange station which requests a forward hard handoff through the control station matching unit and the handoff controller; and a third sub-step in which after the second sub-step, the handoff generation and control apparatus transmits the forward hard handoff completion message of the target exchange station with respect to the forward hard handoff preparation completion message to the service exchange station which requests a forward handoff through the control station matching and the handoff controller, thus performing a forward hard handoff between the serving exchange station and the target exchange station.

4. The method of claim 1, wherein said sixth step includes the sub-steps of:

a first sub-step for requesting a handoff generation and control apparatus to allocate a wireless resource through a handoff controller and a control station matching unit at the time when receiving a backward hard handoff request message which occurs from the handoff generation and control apparatus of the serving exchange station;

a second sub-step for transmitting a backward hard handoff preparation completion message, which denotes a state that the handoff generation and control apparatus allocates a wireless resource in accordance with a wireless resource allocation request in the first sub-step, and a preparation needed for a handoff is completed, to the target exchange station which needs a backward handoff trough the controller; and a third sub-step for performing a backward hard handoff between the target exchange station and the serving exchange station as the handoff generation and control apparatus transmits the backward hard handoff completion message with respect to the backward hard handoff preparation completion message to the target exchange station which requests a backward handoff through the control station matching and handoff controller after the second sub-step.

5. The method of claim 1, wherein said seventh step includes the sub-steps of:

a first sub-step in which the handoff controller receives a backward hard handoff generation message through the control station matching unit of the target exchange station at the time when a backward hard handoff signal is generated from the handoff generation and control apparatus of the target exchange station;

a second sub-step in which the handoff controller, which receives a backward hard handoff message, transmits a backward hard handoff request message to the serving exchange station which requests a forward handoff;

a third sub-step in which releasing a wireless resource information of the control station matching unit and the handoff generation and control apparatus at the time of receiving a response message from the serving exchange station which receives a backward hard handoff request message in the second sub-step; and a fourth sub-step for releasing a wireless resource information which is used during the forward handoff of the handoff controller, the control station matching unit, and the handoff generation and control apparatus at the time when a backward hard handoff completion message is received from the serving exchange station which received the backward hard handoff request message after the third sub-step, accessing a newly allocated wireless resource, and performing a backward hard handoff between the serving exchange station and the target exchange station.

\* \* \* \* \*